(12) United States Patent
Li et al.

(10) Patent No.: US 10,617,124 B2
(45) Date of Patent: Apr. 14, 2020

(54) KITCHEN APPLIANCE AND METHOD

(71) Applicant: KONINKLIJKE PHILIPS N.V., Eindhoven (NL)

(72) Inventors: Wei Li, Eindhoven (NL); Yuqiang Wu, Eindhoven (NL); Zhongchi Luo, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/566,361

(22) PCT Filed: Mar. 31, 2016

(86) PCT No.: PCT/EP2016/056991
§ 371 (c)(1),
(2) Date: Oct. 13, 2017

(87) PCT Pub. No.: WO2016/165946
PCT Pub. Date: Oct. 20, 2016

(65) Prior Publication Data
US 2018/0139970 A1 May 24, 2018

(30) Foreign Application Priority Data

Apr. 15, 2015 (WO) ................ PCT/CN2015/076626
Jul. 14, 2015 (EP) ..................... 15176727

(51) Int. Cl.
*A21C 1/14* (2006.01)
*A21B 7/00* (2006.01)
(Continued)

(52) U.S. Cl.
CPC ................ *A21B 7/005* (2013.01); *A21C 1/02* (2013.01); *A21C 1/146* (2013.01); *A47J 27/004* (2013.01);
(Continued)

(58) Field of Classification Search
CPC .. A21B 7/005; A21B 3/04; A21C 1/02; A21C 1/146; A47J 27/004; A47J 43/04; A47J 43/07; B01F 15/0408
See application file for complete search history.

(56) References Cited

U.S. PATENT DOCUMENTS 2,665,409 A * 1/1954 Rogers ................. G01N 27/223
318/643
3,485,188 A * 12/1969 Cookson ................... A21C 3/00
137/4
(Continued)

FOREIGN PATENT DOCUMENTS

EP 0971227 A1 1/2000
JP 9028560 2/1997
(Continued)

OTHER PUBLICATIONS

W.-N. Liu, Y. Yang, and K.-M. Huang J. of Electromagn. Waves and Appl., vol. 26, 1180-1191, 2012 A Radio Frequency Sensor for Measurement of Small Dielectric Property Changes.

*Primary Examiner* — Steven N Leff

(57) ABSTRACT

A kitchen appliance (100) is disclosed comprising a compartment (110) for receiving flour, said compartment comprising a sensor (120) for producing a sensor reading indicative of a dielectric property of said flour or a product comprising said flour. The kitchen appliance further comprises a processing arrangement (130) communicatively coupled to the sensor for determining an initial moisture content of said flour or product from said sensor reading and adapted to generate a control signal indicative of an amount of water to be added to the compartment as a function of the determined moisture content. A method of controlling a flour product-based food preparation process is also disclosed.

20 Claims, 8 Drawing Sheets

(51) Int. Cl.
*A21C 1/02* (2006.01)
*A47J 27/00* (2006.01)
*B01F 15/04* (2006.01)
*A47J 43/04* (2006.01)
*A47J 43/07* (2006.01)
*A21B 3/04* (2006.01)

(52) U.S. Cl.
CPC .............. *A47J 43/04* (2013.01); *A47J 43/07* (2013.01); *B01F 15/0408* (2013.01); *A21B 3/04* (2013.01)

(56) References Cited

U.S. PATENT DOCUMENTS

| | | | |
|---|---|---|---|
| 3,714,560 A * | 1/1973 | Farr | G01N 22/04 324/659 |
| 3,966,973 A * | 6/1976 | Henry | G01N 27/048 426/231 |
| 4,168,466 A * | 9/1979 | Boldt | G01R 27/02 324/659 |
| 4,319,491 A * | 3/1982 | Christoffersen | G01N 33/10 73/662 |
| 4,590,795 A * | 5/1986 | Oetiker | G01N 33/10 222/57 |
| 4,766,766 A * | 8/1988 | Ahlert | A21C 1/145 366/76.2 |
| 5,133,982 A * | 7/1992 | Bodkin | B02B 1/04 426/231 |
| 5,593,713 A * | 1/1997 | De La Luz-Martinez | A21D 8/06 219/771 |
| 5,735,190 A | 4/1998 | Sham | |
| 5,748,002 A | 5/1998 | Scott | |
| 5,977,532 A * | 11/1999 | Ekemar | H05B 6/46 219/679 |
| 6,035,763 A | 3/2000 | Yung | |
| 7,609,074 B2 * | 10/2009 | Pierce | G01N 33/025 324/664 |
| 8,008,928 B2 | 8/2011 | Herrmann | |
| 10,048,241 B2 * | 8/2018 | Kirkjan | G01N 33/025 |
| 2001/0051202 A1 | 12/2001 | Hofer | |
| 2002/0005725 A1 * | 1/2002 | Scott | G01N 22/00 324/637 |
| 2004/0200823 A1 | 10/2004 | Paller | |
| 2006/0188616 A1 | 8/2006 | Pierce | |
| 2008/0044519 A1 | 2/2008 | Coste | |
| 2015/0150270 A1 | 6/2015 | Barnett | |

FOREIGN PATENT DOCUMENTS

JP 2006223128 A 8/2006
KR 20140082376 A 7/2014

* cited by examiner

KITCHEN APPLIANCE AND METHOD

This application is the U.S. National Phase application under 35 U.S.C. § 371 of International Application No. PCT/EP2016/056991, filed on Mar. 31, 2016, which claims the benefit of International Application No. 15176727.4 filed on Jul. 14, 2015 and International Application No. PCT/CN2015/076626 filed on Apr. 15, 2015. These applications are hereby incorporated by reference herein.

FIELD OF THE INVENTION

The present invention relates to a kitchen appliance comprising a compartment for receiving flour.

The present invention further relates to a method of controlling a flour product-based food preparation process.

BACKGROUND OF THE INVENTION

The water or moisture content is an important parameter when making flour-based food, such as baked products such as bread, cakes, tarts, and so on, or noodles for instance, as the water or moisture content plays a pivotal role in gluten formation and starch gelatinization. Having an incorrect water or moisture content in the flour-based food product during its preparation may lead to an unsatisfactory food product that for instance did not correctly bake or cook and that may have an unsatisfactory texture, e.g. an undesirable mouth feel.

The addition of water to the food product is typically a manual task prone to errors, which can lead to the aforementioned sub-optimal food preparation. Moreover, even if the amount of water is carefully measured and added, the initial amount of moisture present in the flour can vary, which therefore still can give inconsistent food product results.

EP 0 971 227 A1 discloses an instrument for measurement of moisture content of an article such as grains, pulverised samples, fruits, nuts and dry fruits, industrial and food products. The instrument uses the measurement of dielectric properties for quantifying the moisture content of samples working in the range of microwave frequencies. Although such an instrument can be helpful in determining the (initial) moisture content in flour or flour-based food products, it does not assist its user in correctly managing the food preparation process.

SUMMARY OF THE INVENTION

The present invention seeks to provide a kitchen appliance that assists its user in achieving flour-based food products having the desired moisture content.

The present invention further seeks to provide a method of controlling a flour product-based food preparation process in order to achieve flour-based food products having the desired moisture content.

According to an aspect, there is provided a kitchen appliance comprising a compartment for receiving flour, said compartment comprising a sensor for producing a sensor reading indicative of a dielectric property of said flour or a product comprising said flour (both from hereon also referred to as the food product); and a processing arrangement communicatively coupled to the sensor for determining an initial moisture content of said flour or product from said sensor reading and adapted to generate a control signal indicative of an amount of water to be added to the compartment as a function of the determined initial moisture content.

The inventors have realized that the determination of an initial moisture content of the flour or flour-based food product, e.g. dough, can be used as a feedback mechanism for controlling the amount of water to be added to the compartment in order to ensure that the food product produced in the kitchen appliance has the desired moisture characteristics.

For example, the kitchen appliance may comprise a user interface including a display screen, wherein the control signal is for generating a water addition instruction on said display screen, thereby providing clear instructions to the user as to how much water should be added to the food product based on its initial moisture content in order to ensure that the food product has the desired moisture content that allows for the food product to have the desired characteristics after preparation, e.g. after a cooking or baking.

Alternatively, the kitchen appliance may comprise a water inlet responsive to said control signal such that the kitchen appliance can automatically control the moisture content of the food product, thereby avoiding the risk of user error. Such a water inlet may be in fluid communication with a water tank of the kitchen appliance or may be fluidly coupled to an external water supply such as a mains water supply.

The processing arrangement may be adapted to generate said control signal as a function of a series of said dielectric property sensor readings. This improves the accuracy of the initial moisture content determination.

The sensor may for instance be located in a floor of the compartment, above the flour or product, or in a mixing element of the kitchen appliance. The sensor may be in physical contact with the flour or flour-based product in order to achieve a more accurate sensor reading.

In an embodiment, the sensor comprises a probe for transmitting a radio-frequency signal and for receiving a reflection of said signal, said reflection corresponding to said dielectric property. Such a sensor is particularly suitable for probing the food product in a non-destructive manner and for producing a sensor signal from which the initial moisture content can be derived by the processing arrangement.

The probe may be a coaxial probe comprising a coaxial line for transmitting the radio-frequency signal and a flange adjacent said coaxial line for receiving said reflection. Such a sensor geometry is particularly suited for integration in a kitchen appliance.

In an embodiment, the processing arrangement is arranged to generate the control signal based on a user preference of a property of a food product to be produced from the flour or product. For example, the user may be able to select a preferred property, e.g. a desired texture of the food product, using a user interface, with the user preferences being stored in a suitable data storage device such as a non-volatile memory or the like.

In an embodiment, the processing arrangement is programmable to receive a correlation between the sensor reading and initial moisture content. In this manner, the kitchen appliance may be calibrated, e.g. by a user of the kitchen appliance loading the compartment with flour or a flour-based product having a known moisture content.

The processing arrangement may be embodied by any suitable processor configuration, such as a single processor. The processing arrangement may comprise discrete stages, such as a detection stage for detecting the sensor reading, a determination stage for determining the moisture content from the detected sensor reading and a water adding stage for generating the control signal. These discrete stages may be embodied by one or more processing units.

In an embodiment, the processing arrangement is further adapted to operate the kitchen appliance as a function of the sensor reading. This embodiment is based on the insight that changes in the chemical structure of the flour-based food product, e.g. starch gelatinization, during the food preparation process causes changes in the dielectric properties of the food product, such that these changes can be used to monitor and control the food preparation process, e.g. the cooking or baking process.

To this end, the kitchen appliance may further comprise a heating unit, wherein the processing arrangement is further adapted to determine the amount of water bound to the flour or product from the sensor reading and to generate a further control signal for controlling an amount of power supplied to the heating unit as a function of the determined amount of bound water in order to ensure that the food preparation process yields a food product with the desired characteristics.

In an embodiment, the kitchen appliance is one of a noodle maker, dough maker or bread maker. Such appliances particularly benefit from one or more of the aforementioned embodiments.

According to another aspect, there is provided a method of controlling a flour product-based food preparation process, the method comprising measuring a dielectric property of the flour product during the cooking process; determining an initial moisture content of the flour product from the measured dielectric property; and generating a control signal for adding water to the flour product as a function of said determined moisture content. This facilitates the preparation of a flour-based food product having the desired characteristics where such characteristics are directly or indirectly related to the initial moisture content of the food product.

The method may further comprise determining the amount of water bound to the flour product; and generating a further control signal for controlling an amount of power supplied to a heating unit as a function of the determined amount of bound water in order to more accurately control the preparation process of the food product.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
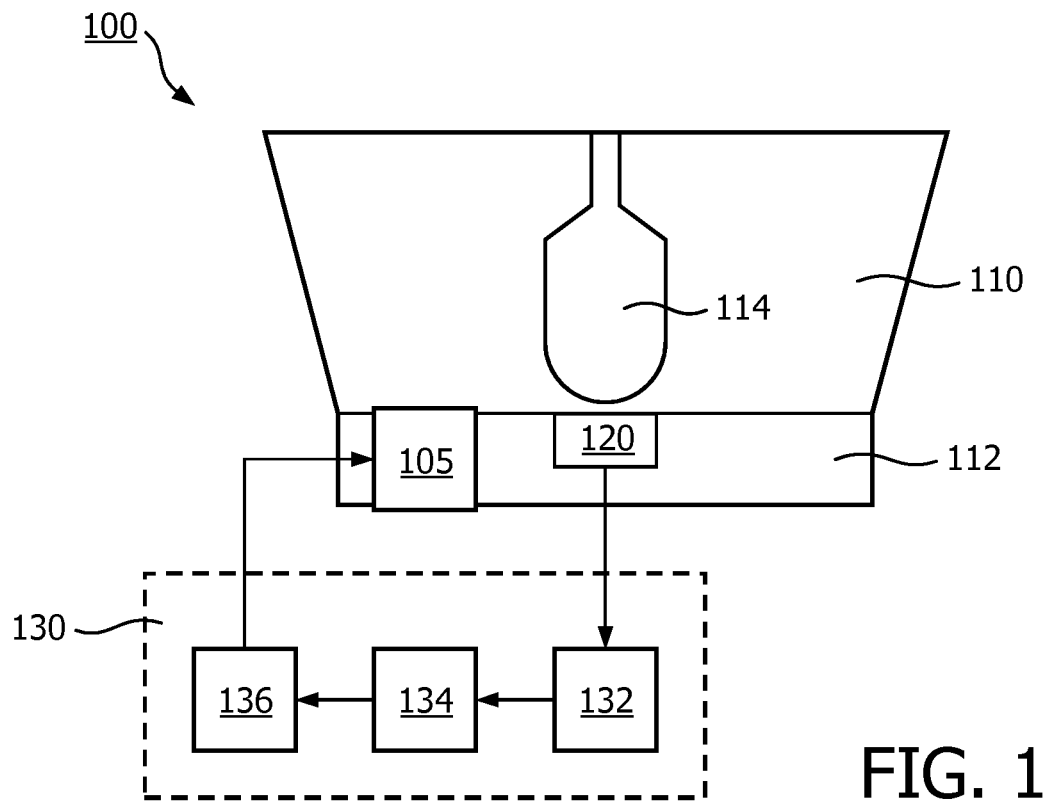
FIG. 1 schematically depicts a kitchen appliance according to an embodiment.

It should be understood that the Figures are merely schematic and are not drawn to scale. It should also be understood that the same reference numerals are used throughout the Figures to indicate the same or similar parts.

FIG. 1 schematically depicts a kitchen appliance 100 according to an embodiment. The kitchen appliance 100 comprises a compartment 110 for receiving flour or a flour-based product such a dough for kneading, which compartment 110 typically comprises a floor 112 and a mixing implement 114 such as a mixing blade, a dough hook or the like. The mixing implement 114 may be interchangeable such that the user of the kitchen appliance 100 can choose the appropriate mixing implement 114 for the food processing job to be performed with the kitchen appliance 100.

The kitchen appliance 100 further comprises a dielectric sensor 120 for measuring a dielectric property of the flour or a flour-based product in the compartment 110. In FIG. 1, the dielectric sensor 120 is located in the floor 112 of the compartment although other any other suitable location may be chosen for the dielectric sensor 120, some non-limiting examples of which will be provided below. The dielectric sensor 120 preferably is arranged such that the dielectric sensor is in physical contact with the flour or flour-based product in the compartment 110 as this gives the most accurate results when determining the dielectric property of the flour or flour-based product with the dielectric sensor 120. However, this is not essential; it is also feasible that the dielectric sensor 120 does not physically contact the flour or flour-based product but instead probes the flour or flour-based product through the air.

In a preferred embodiment, the dielectric sensor 120 employs radio frequency (RF) probe signals for probing the flour or flour-based product. For example, the dielectric sensor 120 may comprise a RF transmitter and a sensor element for sensing reflections of the transmitted RF signals by the flour or flour-based product. It has been found that the ratio ($S_{11}$) of reflected RF power to transmitted RF power by such an RF dielectric sensor 120 is directly related to the moisture content in flour or a flour-based product such as dough or noodles.

This can be understood as follows. RF radiation is often used to monitor dielectric properties. When applying an alternating external electromagnetic field at radio frequencies, e.g. to flour or a flour-based product, the movement of free ions and polar molecules therein aligns in the direction of the electric field. This behavior consumes energy from the electromagnetic field, such that information about the dielectric properties of the substance under investigation can be obtained by measuring the reflected signal strength. It is noted that the low frequency part of the RF domain is more sensitive to the energy loss in ionic conduction while the energy loss in dipole rotation is typically triggered by high frequency parts of the RF domain. In flour or dough, ionic conduction is negligible since the water content is relatively low and water molecules are the major polar molecules present. Therefore, the ratio of reflected power to emitted power of an RF sensor probe ($S_{11}$) is a good indicator of the moisture in the flour or dough. This will be demonstrated in more detail below by some examples.

Any suitable sensor geometry may be contemplated. In case of a dielectric sensor 120 in physical contact with the flour or flour-based product, a particularly suitable geometry is an open-ended coaxial probe. The coaxial probe comprises a coaxial line for transmitting the RF signals and a flange in physical contact with the flour or flour-based product for sensing the induced electric field in the flour or flour-based product. The flange for instance may surround the coaxial line. In a non-contact geometry, the flange may be replaced by a receiver element such as an antenna or the like for collecting reflected RF signals in a non-contact mode. The RF transmitter may be arranged to transmit RF signals of any suitable frequency, such as broadband signals or signals of a distinct radio frequency, e.g. narrowband signals of a particular radio frequency. Such sensors are well-known per se and it should be understood that any suitable dielectric sensor, e.g. any suitable RF-based sensor, may be used in the kitchen appliance 100.

The kitchen appliance 100 further comprises a processing arrangement 130 for processing the sensor signals produced by the dielectric sensor 120 and to derive an initial moisture content of the flour or flour-based product in the compartment 110 from the processed sensor signals. The dielectric sensor 120 may be communicatively coupled to the processing arrangement 130 in any suitable fashion, e.g. in a wired or wireless fashion. The processing arrangement may comprise a detection stage 132 for detecting the sensor reading provided by the dielectric sensor 120, a determination stage 134 for determining the moisture content from the detected sensor reading and a water adding stage 136 for generating a control signal indicative of an amount of water to be added to the compartment 110 as a function of the determined moisture content by the determination stage 134. It should be understood that the processing arrangement 130 may comprise discrete stages 132, 134 and 136, which may be implemented in any suitable manner, e.g. using different processing elements such as different cores of a single processor or different discrete processors, e.g. microprocessors. It is however equally feasible that the processing arrangement 130 does not contain discrete physical stages 132, 134, 136 but that the processing arrangement 130 implements these different stages on a single processor architecture, e.g. in the form of computer program instructions executed on this processor architecture. It suffices to say that any suitable implementation of the functionality conceptually provided by the stages 132, 134, 136 may be contemplated.

In an embodiment, the control signal indicative of an amount of water to be added to the compartment 110 may be a control signal for controlling a display 105 of a user interface of the kitchen appliance 100, which control signal causes the display 105 to display the amount of moisture to be added by the user to the compartment 110. In this embodiment, the processing arrangement 130 is adapted to convert the sensor readings of the dielectric sensor 120 into an initial moisture content of the flour or flour-based product in the compartment 100 and to derive user instructions for adding the correct of moisture to the flour or flour-based product in the compartment 100 based on the determined initial moisture content of the flour or flour-based product in the compartment 100.

Figure 2:
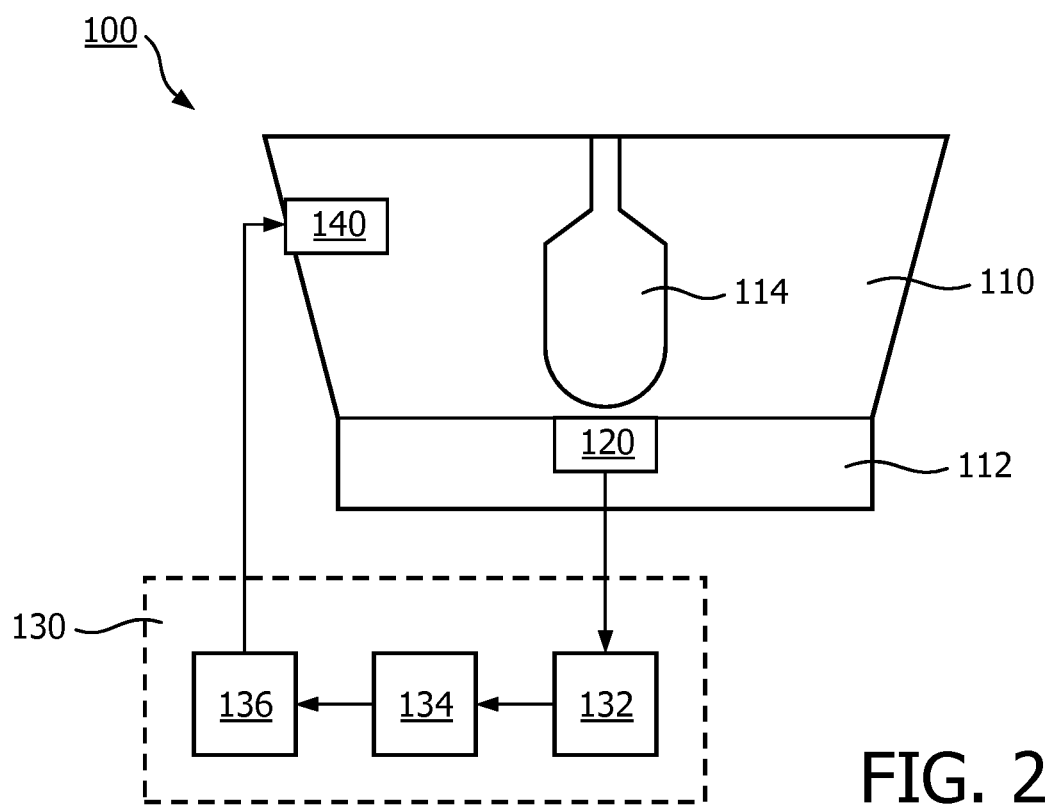
FIG. 2 schematically depicts a kitchen appliance according to another embodiment.

An alternative embodiment of the kitchen appliance 100 is shown in FIG. 2, in which the kitchen appliance 100 comprises a water inlet 140 under control of the control signal indicative of an amount of water to be added to the compartment 110 generated by the processing arrangement 130. In this embodiment, the processing arrangement 130 is adapted to convert the sensor readings of the dielectric sensor 120 into an initial moisture content of the flour or flour-based product in the compartment 100 and to automatically add the correct of moisture to the flour or flour-based product in the compartment 110 based on the determined initial moisture content of the flour or flour-based product in the compartment 100. The water inlet 140 for instance may comprise a valve or the like that may be opened under control of the control signal indicative of an amount of water to be added to the compartment 110.

In case of a water inlet 140 coupled to a water supply having a known flow rate, e.g. a water reservoir that feeds the water inlet 140 through gravity of a pump with a known flow rate, the water inlet may be opened by the control signal for a certain amount of time T, with $T=\Delta m/f$, with f the flow rate (e.g. in ml/s) through the water inlet 140 and $\Delta m$ the determined amount of water (e.g. in ml) to be added to the compartment 110. The water inlet 140 may comprise the pump, in which case the control signal may directly control, e.g. enable, the pump to regulate the amount of water to be added to the compartment 110.

In case of a water inlet 140 coupled to a water supply having an unknown flow rate, e.g. a mains water supply having variable pressure, the processing arrangement 130 may actively monitor changes in the dielectric properties of the flour or flour-based product in the compartment 110 that result from the addition of water to the compartment 110 through the water inlet 140, e.g. following mixing of the added water into the flour or flour-based product using the mixing implement 114.

The processing arrangement 130 may be adapted to incrementally add water to the flour or flour-based product in the compartment 110 until the detected changes in the dielectric properties of the flour or flour-based product correspond to the desired moisture content in the flour or flour-based product. The kitchen appliance 100 may be adapted to mix the added water into the flour or flour-based product after each incremental water addition, e.g. through kneading with the mixing implement 114, and to determine the changes in the dielectric properties of the flour or flour-based product during and/or after mixing. This may involve a series of sensor measurements to obtain an average dielectric property of the flour or flour-based product to cancel out local variations in the moisture content of the flour or flour-based product as will be explained in more detail below.

The processing arrangement 130 may additionally or alternatively be adapted to determine the actual water flow rate from enabling the water inlet 140 for a defined period of time and calculating the amount of water added to the flour or flour-based product over this period of time from detected changes in the dielectric properties of the flour or flour-based product. The thus determined flow rate may be used for subsequent control of the water inlet 140 as explained above, e.g. to add the remaining amount of water to be added to the flour or flour-based product through the water inlet 140.

Figure 3:
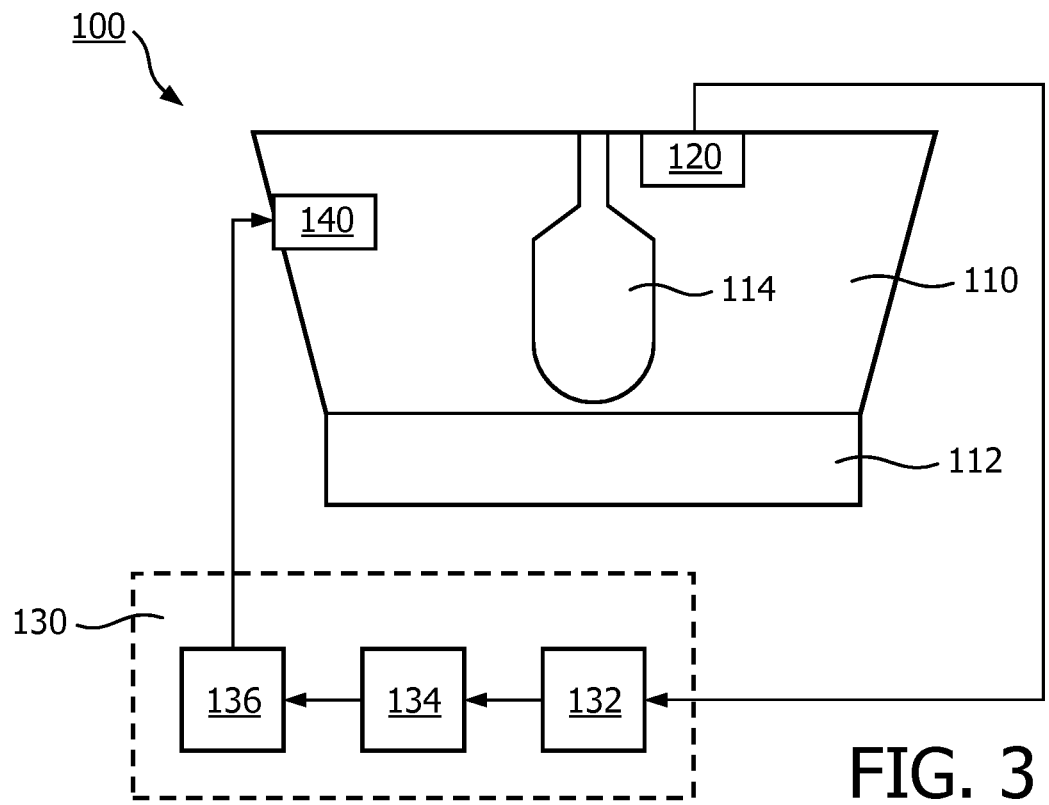
FIG. 3 schematically depicts a kitchen appliance according to yet another embodiment.
Figure 4:
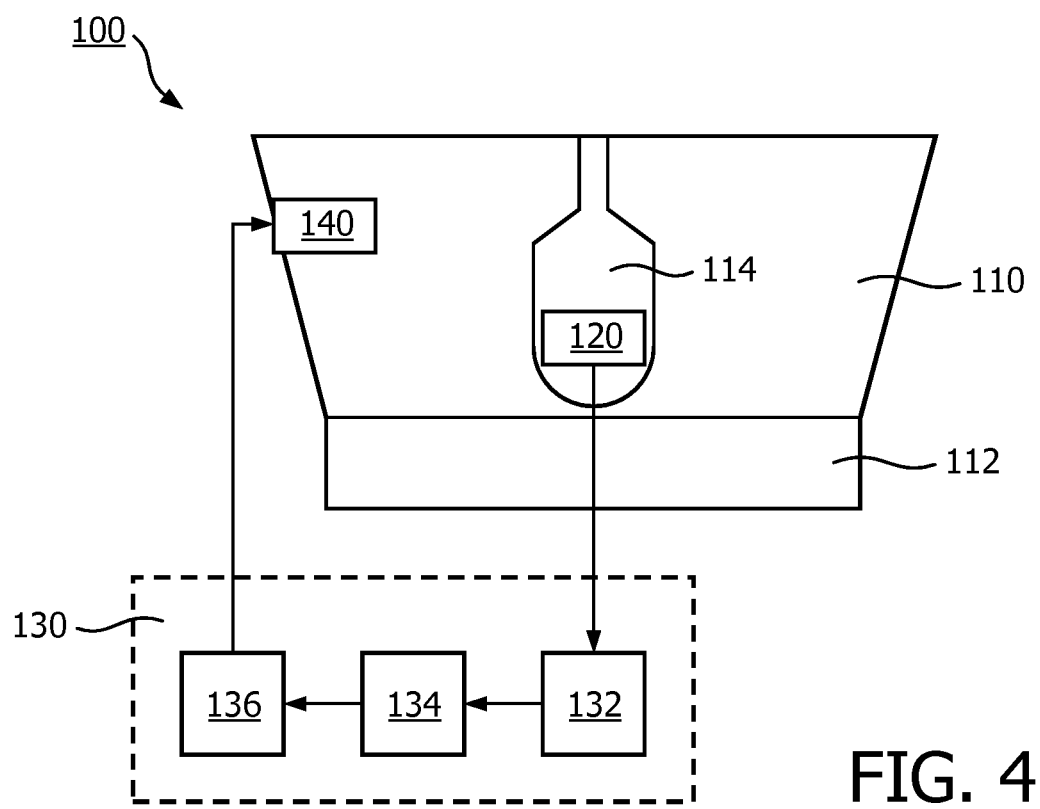
FIG. 4 schematically depicts a kitchen appliance according to yet another embodiment.

As previously mentioned, the dielectric sensor 120 may be located in any suitable location of the kitchen appliance 100. In FIG. 3, the dielectric sensor 120 is located over or above the flour or flour-based product in the compartment 110, e.g. in a lid or the like of the kitchen appliance 100 on the compartment 110, in which case the dielectric sensor 120 may not contact the flour or flour-based product. In FIG. 4, the dielectric sensor 120 is integrated in the mixing implement 114, which for instance is particularly suitable if the dielectric sensor 120 is to contact the flour or flour-based product. In this embodiment, the processing arrangement 130 may derive the dielectric properties of the flour or flour-based product, in particular the dielectric properties of dough, from a series of sensor readings provided by the dielectric sensor 120, e.g. by averaging the dielectric properties obtained from each sensor reading. This for instance ensures that when mixing the dough with the mixing implement 114, the dielectric sensor 120 is in contact with different portions of the dough that may have different local compositions, such that averaging the dielectric properties of the different portions of the dough ensures that the average properties of the dough are captured rather than a localized property of the dough, which may not accurately reflect the average moisture content of the dough. In an embodiment, the mixing implement 114 is not mounted in the kitchen appliance 100, but is a mixing implement for manual use, e.g. a stirring spoon, chop sticks or the like, with the dielectric sensor 120 wirelessly connected to the processing arrangement 130.

It is noted for the avoidance of doubt that other suitable locations of the dielectric sensor 120 will be immediately apparent to the skilled person. Also, it is emphasized that although FIG. 3 and FIG. 4 schematically depict different sensor locations for the kitchen appliance 100 having automatic water addition control through the water inlet 140, it is of course equally feasible to place the dielectric sensor 120 in these locations for a kitchen appliance 100 of FIG. 1, i.e. a kitchen appliance relying on manual water control by issuing water addition instructions on a display 105 as previously explained.

In an embodiment, the processing arrangement 130 employs a predictive model for deriving the initial moisture content in flour or a flour-based food product. This predictive model may be pre-programmed into the kitchen appliance 100, e.g. stored in a data storage device such as a non-volatile memory or the like, that is accessible to the processing arrangement 130. Alternatively, the processing arrangement 130 may be adapted to generate the predictive model in a training mode of the kitchen appliance 100, e.g. by placement of our or a flour-based food product with a known moisture content in the compartment 110 and calibrating the processing arrangement 130 by correlating the determined dielectric property to the known moisture content. This may be achieved in any suitable manner, for instance by a user programming the known moisture content into the kitchen appliance 100 through any suitable user interface and by the processing arrangement 130 storing the determined correlation in the data storage device for future reference. Other suitable calibration methods will be apparent to the skilled person.

Figure 6:
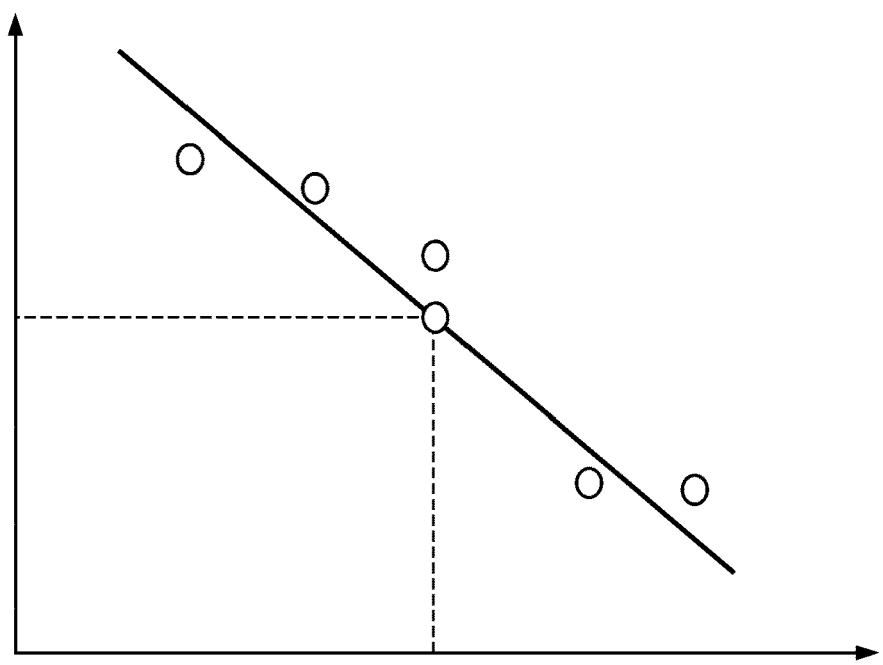
FIG. 6 is a graph depicting the correlation between flour initial moisture content and a dielectric property of the flour.

FIG. 6 depicts the relation between $S_{11}$ (y-axis) and the moisture content in flour (x-axis). As can be seen, a more or less linear relation exists between the ratio S11 and the initial moisture content in flour, such that the predictive model can be derived from linear regression of a number of flour samples having known moisture content.

In an embodiment, the kitchen appliance 100 may store user-defined preferences of the moisture content of flour or a flour-based product in a data storage device such as a non-volatile memory or the like for access by the processing arrangement 130. For example, a user may define the target moisture content of the flour or flour-based product, e.g. using any suitable user interface of the kitchen appliance 100, for example to achieve the preparation of a food product having a desired texture or mouth feel. It is for instance well-known that the mouth-feel of noodles is related to the water content in the flour product used to make the noodles. The processing arrangement 130 may generate the control signal for the display 105 or the water inlet 140 based on the difference between the actual initial moisture content of the flour or flour-based product and the user-defined target moisture content stored in the data storage device. Alternatively, the target moisture content may be predefined, e.g. a default value stored in the kitchen appliance 100.

In an embodiment, the processing arrangement 130 does not determine the exact moisture content in a flour-based food product such as dough but instead determines a trend in the dielectric property of the flour-based food product resulting from the addition of water to the flour-based food product. This is based on the insight that is not necessary to know the exact moisture content to determine whether a flour-based food product such as dough has the optimal moisture or how much water should be added.

Figure 7:
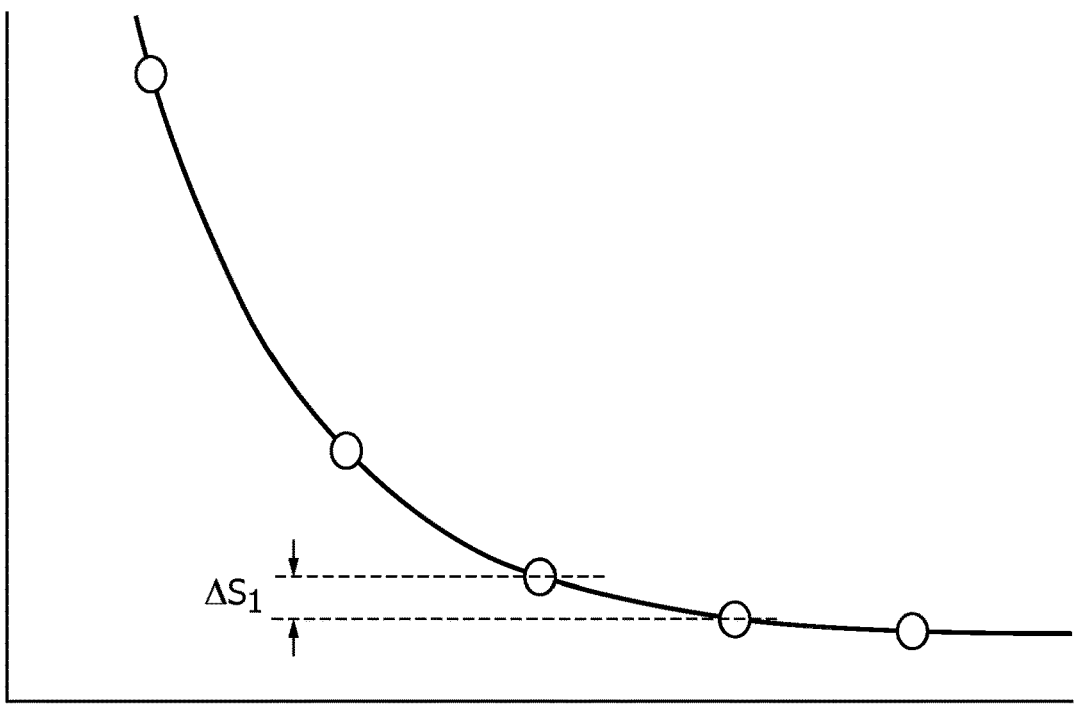
FIG. 7 is a graph of a correlation between dough moisture content and a dielectric property of the dough.
Figure 8:
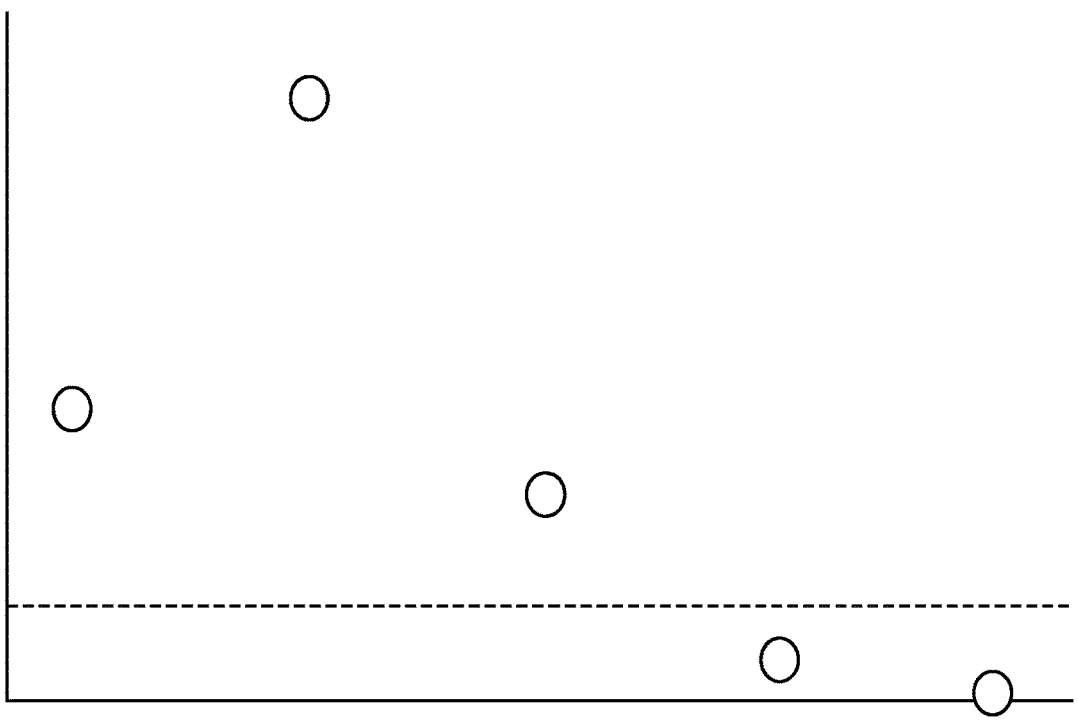
FIG. 8 is a graph of dough moisture determination from a variance in a measured dielectric property of the dough.

It has been found out that ratio $S_{11}$ experiences an exponential decay when water is added to dough, as is depicted in FIG. 7, which shows the value of $S_{11}$ as a function of moisture content in dough. The transition region $\Delta S_1$ can be used to determine when the dough has the correct moisture content. Moreover, the variance of $S_{11}$ measured at the same moisture content also decreases exponentially after reaching a peak value as shown in FIG. 8, and can also be used as an indicator of the optimal value of moisture in a flour-based product such as dough. For example, the following protocol may be implemented by the processing arrangement 130:

In a first step, the processing arrangement 130 generates the control signal indicative of an initial amount of water to be added to the compartment 110, for instance to control the water inlet 140 or to generate water adding instructions on the display 105 as previously explained. Consequently, the initial amount of water is added to the flour to start the kneading with the mixing implement 114 in order to produce the flour-based product. The initial amount of water is calculated based on the weight of flour and is much less than the total amount of water that is typically added to the flour to produce the flour-based product with optimal moisture content. The weight of the flour may be specified by the user, e.g. using a user interface to specify the weight or instead the kitchen appliance 100 may include a weight sensor (not shown) for determining the weight of the flour added to the compartment 110.

In the next step, the dough is kneaded for a fixed period of time, during which $S_{11}$ is periodically determined logarithmically (i.e. using the formula $20*\log^{10}(|S_{11}|)$, in dB. This will be simply referred to as $S_{11}$ below, unless indicated otherwise. The average $S_{11}(n)$ and variance values $\delta S_{11}(n)$ is subsequently determined from the n periodic measurements of $S_{11}$.

In one approach, it may be subsequently determined if $r(S_{11})$ is below a predefined threshold as per Equation (1), which indicates that the dough is ready for cooking.

$$r(S_{11})=((S_{11}(n)-S_{11}(n-1))/(S_{11}(n)), \text{ with } n=2,3,4,\ldots \quad (1)$$

In an alternative approach, it may be subsequently determined if variance value is below a predefined threshold value C as per Equation (2), $$(\delta S_{11}(m))/((\delta S_{11}^{max}) < C \qquad (2)$$

which indicates that the dough is ready for cooking. In this equation $\delta S_{11}^{max}$ is the maximum determined variance $\delta S_{11}(m)$ during the $m^{th}$ of the n periodic measurements.

In both approaches, by detecting trends in the values of $S_{11}$ or its variance, the point during the kneading process at which sufficient water has been added to the flour to yield dough with the right consistency can be detected from these trends, thus obviating the need to determine the exact moisture content in the dough.

Figure 5:
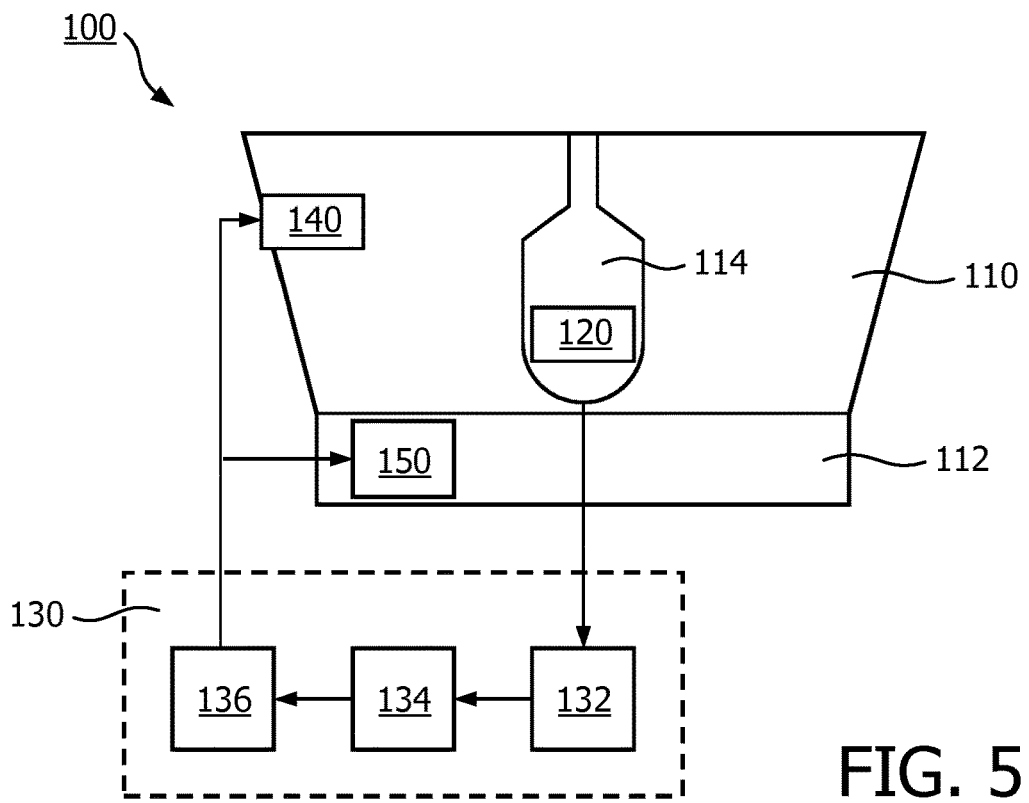
FIG. 5 schematically depicts a kitchen appliance according to a further embodiment.

The dielectric property of the flour or flour-based product as determined by the processing arrangement 130 may further be utilized to control a preparation process of a food product from the flour or flour-based product, e.g. a cooking or baking process in which the food product is prepared by exposing the flour or flour-based product to heat. FIG. 5 schematically depicts a kitchen appliance 100 for such food preparation. Compared to the kitchen appliance 100 shown in FIG. 4, the kitchen appliance 100 in FIG. 5 further comprises a heating element 150, here located in the floor 112 of the compartment 110 by way of non-limiting example only, under control of the processing arrangement 130. The processing arrangement 130 is arranged to generate a further control signal for controlling an amount of power supplied to the heating element 150 as a function of the determined amount of water bound to the flour or flour-based product, which may be derived from the measured dielectric property as will be explained below. Although not shown, the kitchen appliance 100 may further comprise a temperature sensor communicatively coupled to the processing arrangement 130 for controlling the heating element 150 in response to the temperature sensed by the temperature sensor, i.e. the temperature of the flour or flour-based product during preparation of the food product.

The heating element 150 for instance may be used to control the gelatinization of noodles or pasta during a cooking process based on sensor data provided by the dielectric sensor 120 to the processing arrangement 130. The motivation for this can be understood as follows. Starch is a carbohydrate consisting of a large number of glucose units joined by glycosidic bonds. It is the most common carbohydrate in human diet and serves as a major source of energy. Raw starch will digest poorly. Fully gelatinized (cooked) starch is easier to digest. Starch gelatinization is a process that breaks down the intermolecular bonds of starch molecules in the presence of water and heat, allowing the hydrogen bonding sites to engage more water. Thus, during the gelatinization process, free water molecules are bound to these hydrogen bonding sites, which causes changes in the dielectric properties of the starch-containing food product comparable to the trend depicted in FIG. 7, i.e. an exponential decay of $S_{11}$ with increased gelatinization of the food product when the temperature in the kitchen appliance 100 is stabilized above the gelatinization temperature of the food product.

This behaviour may be utilized by the kitchen appliance 100 in order to control the degree of gelatinization of the food product as follows by way of non-limiting operating example.

In a first step, the starch-rich food product is heated using the heating element 150 in accordance with a pre-set temperature curve. As the temperature approaches the gelatinization temperature, e.g. as monitored with the temperature sensor, the power of the heating element 150 should be maximized such that the temperature rapidly surpasses the gelatinization temperature. This ensures that gelatinization of the food product during the heat-up process is negligible.

In the next step, the temperature is stabilized at a certain value above the gelatinization temperature by appropriate control of the heating element 150 and the dielectric property $S_{11}$ is periodically recorded, e.g. logarithmically as previously explained.

Once enough data points have been collected, an exponential fitting curve may be generated to predict the gelatinization trend using Equation (3):

$$S_{11} = Ae^{-Bt} + C \qquad (3)$$

where t is time and A, B and C are fitting parameters (B>0). Suppose at $t=t_a$, $S_{11}=S_a$ as per this formula. Use g to predict the gelatinization level as per Equation (4):

$$g = S_a/((S_{11}|_{t=0}) - S_{11}|_{t=\infty})) = S_a/A \qquad (4)$$

The parameter g typically has a target value indicative of the desired degree of gelatinization of the food product. The fitting of the measurement data and prediction of the gelatinization level may be repeated until g reaches this target value, after which the food preparation process may be terminated as the food product has reached the desired gelatinization level.

It is noted that although the kitchen appliance 100 in FIG. 5 is shown to have a water inlet 150 for automatic addition of water to the compartment 110, it is of course equally feasible for the kitchen appliance 100 to comprise a display 105 to generate user instructions for manual water addition as previously explained. It is further reiterated that the dielectric sensor 120 is shown in the mixing implement 114 by way of non-limiting example only; the dielectric sensor 120 may be in any suitable location within the kitchen appliance 100 as previously explained.

Proof of concept of several aspects of the present invention will now be demonstrated by the following examples. These examples are for illustrative purposes only and should not be construed as limiting the scope of the present invention.

Example 1—Initial Moisture Determination in Flour

Flour samples were obtained from a local supplier, and stored at room temperature (about 21° C.). The initial moisture of each flour sample was measured using a moisture analyser (Halogen HR83) and determined to be 13.02 wt % of the total weight of the flour. To each sample, 1 wt % water was added using a humidifier. This was done three times, after which 5 wt % water was added to the flour samples.

The dielectric properties of the flour samples were measured at different frequencies using a dielectric sensing system on top of the flour samples. As the dielectric sensor, an open-ended coaxial probe consisting of a coaxial line with a male SMA (small A type) connector and a soldered SMA panel jack with a flange (RS Components Ltd.) was used. The probe was kept stationary and in intimate contact with the flour samples. A vector network analyser (VNA, Agilent E5071C) was used as the signal generator and receiver. $S_{11}$ was measured prior to and after each addition of water to the flour samples.

Figure 9:
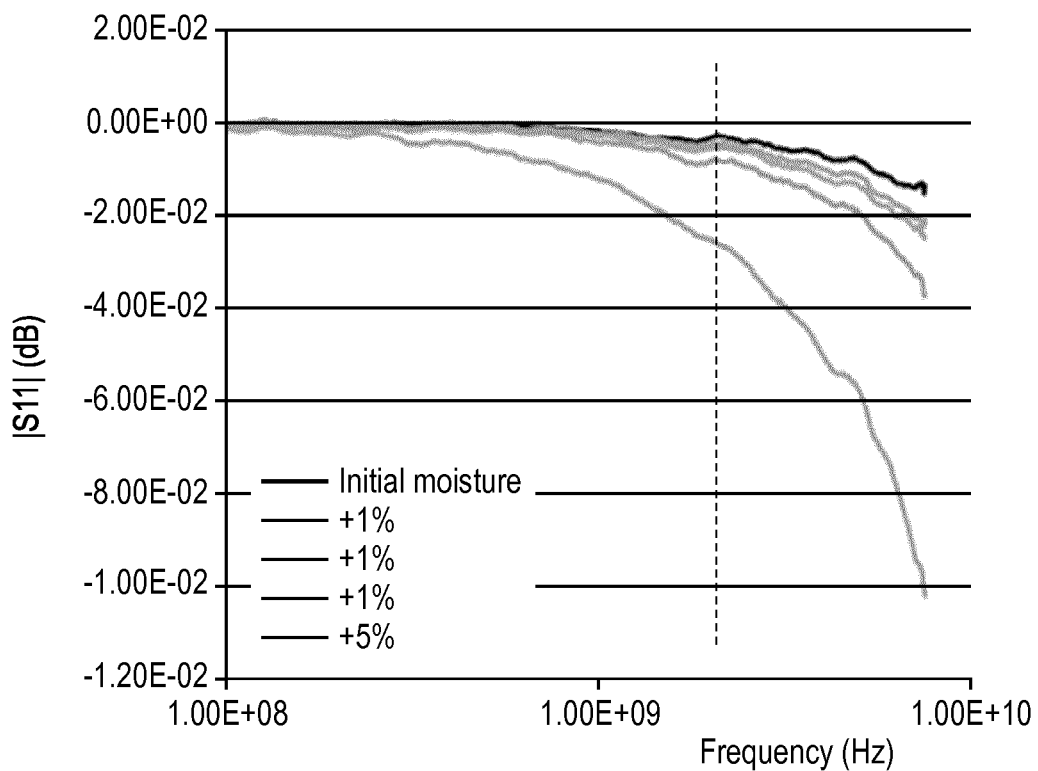
FIG. 9 is a graph of a test result demonstrating proof of concept.

The results are shown in FIG. 9, which depicts the absolute value of S11 (dB) as a function of different moisture contents when probed at different radio frequencies. From the lack of response at low radio frequencies (1.00E+08), it can be concluded that water molecule dipole interactions dominate the dielectric mechanism since ionic conduction, which typically manifests itself at the lower end of the RF frequency spectrum, is negligible with low water content presented in the flour. Also, it is evident that the $S_{11}$ curve changes with the moisture content in the flour, thus clearly demonstrating that is the behaviour of S11 is correlated to the water content.

Figure 10:
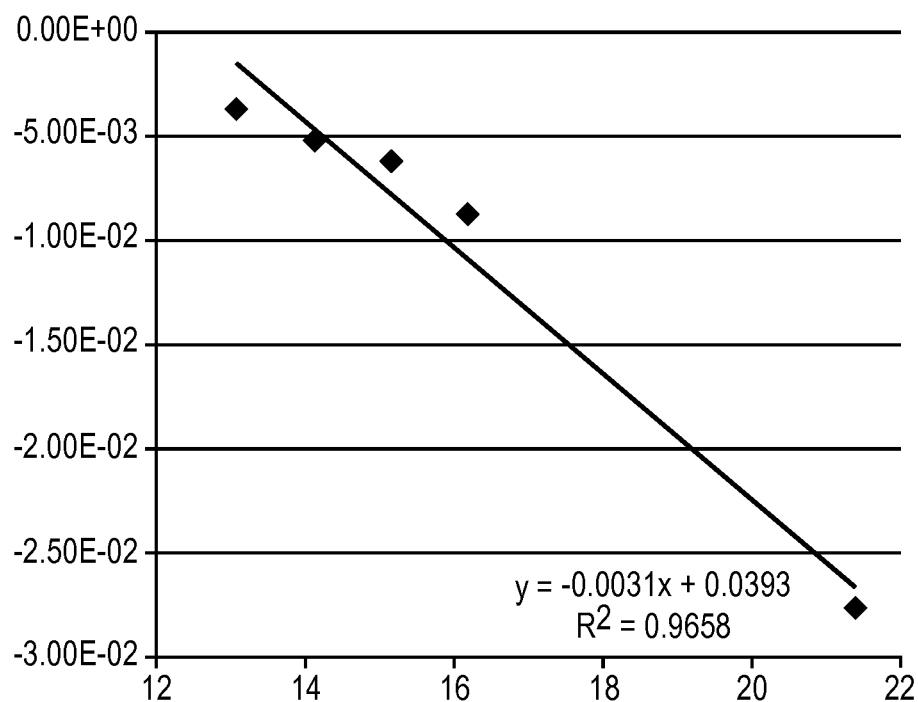
FIG. 10 is another graph of a test result demonstrating proof of concept.

FIG. 10 depicts the changes in $S_{11}$ (y-axis) measured using a probe frequency of 2.45 GHz as a function of the changes in moisture content (wt %, x-axis) induced by the introduced moisture. A linear correlation between $S_{11}$ and moisture content is clearly demonstrated (standard deviation $R^2=0.97$), and further shows that the changes in S11 are pronounced enough to facilitate the detection of a 1% change by weight in the moisture contents of the flour. The sensitivity of a kitchen appliance 100 may be improved by probe frequency optimization, e.g. by using a higher frequency, probe design (e.g. using a larger flange, and so on.

Example 2—Sensing and Controlling Moisture Content in Dough

Flour samples were obtained from a local supplier, and stored at room temperature (about 21° C.). A dough maker from Murenking is used to stir and knead the dough. Initially, 30 wt % water was added into the flour and mixed for 5 min and 8 measurements of $S_{11}$ were taken at regular intervals using the dielectric sensor setup described in Example 1 to obtain an indication of the average moisture content of the dough. Subsequently, 2 wt % water was added and mixed for 3 min each time and 8 measurements of $S_{11}$ were taken at regular intervals for the reasons given above. This was repeated 4 times.

Figure 11:
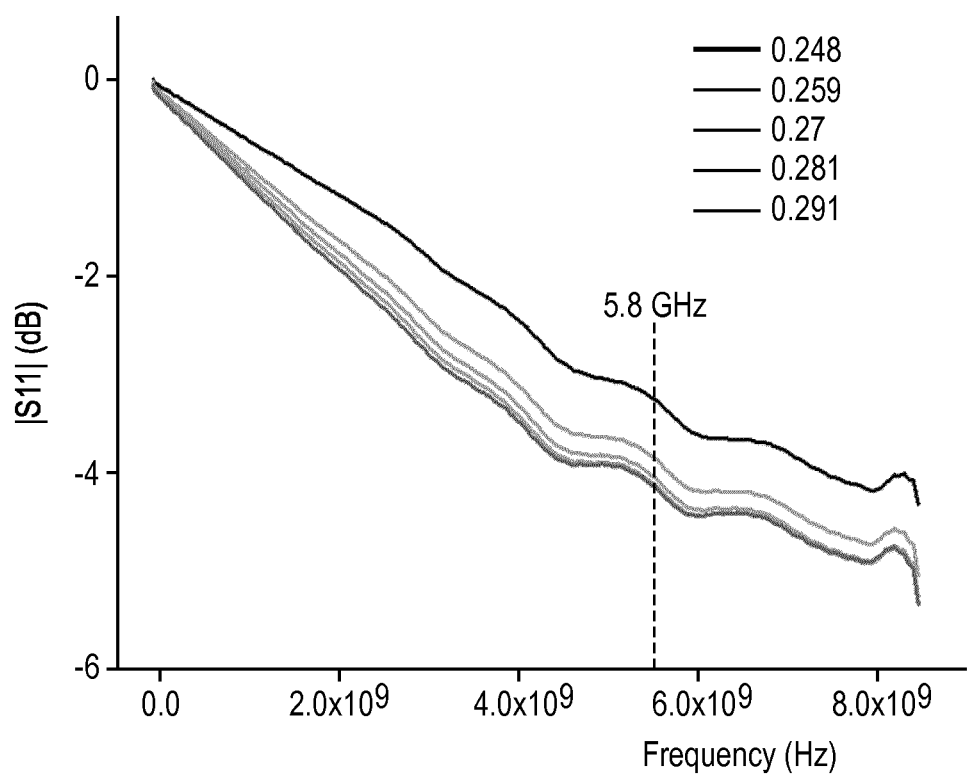
FIG. 11 is a graph of the logarithmic spectra of the dielectric property as a function of dough moisture content.
Figure 12:
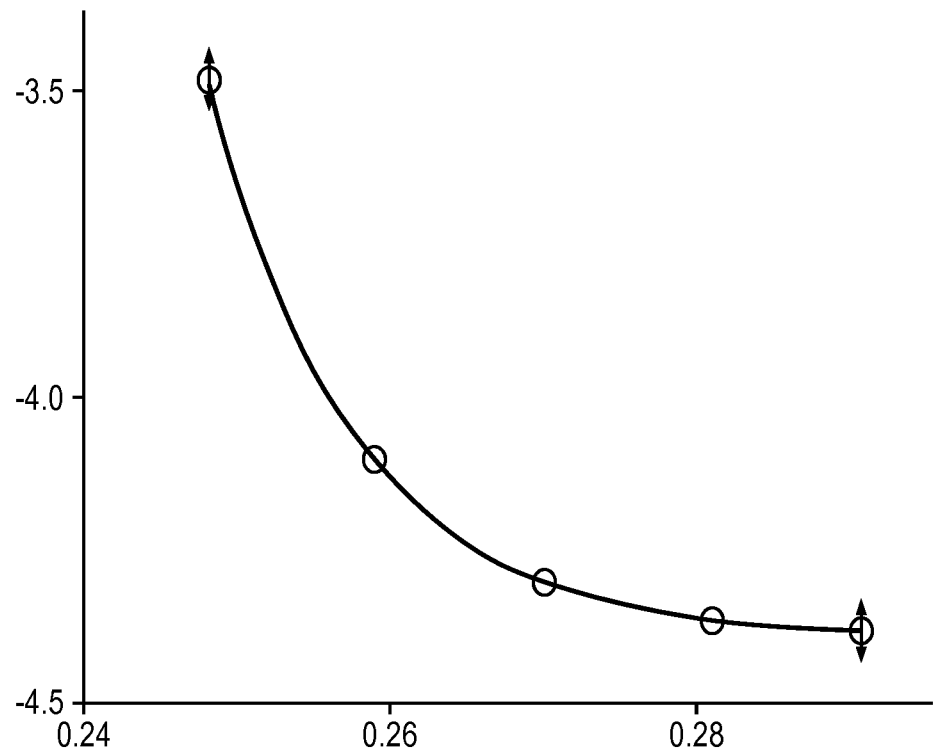
FIG. 12 depicts the averaged spectra of the dielectric property as a function of dough moisture content.

FIG. 11 shows the averaged logarithmic spectra of $S_{11}$. As the moisture content of the dough increases, the magnitude of $S_{11}$ drops accordingly. FIG. 12 shows $S_{11}$ determined at a probe frequency of 5.8 GHz as a function of the dough moisture, i.e. the percentage of water in the overall dough mixture by weight. It can be seen that the changes to $S_{11}$ are pronounced enough to detect 1 wt % change in moisture content of the dough.

An exponential decay curve could be fitted with high accuracy ($R^2=0.99997$) for the change in $S_{11}$ versus dough moisture. The $r(S11)$ given by Equation (1) is listed in Table 1, in which n is the $n^{th}$ addition of 2 wt % water to the dough mixture.

TABLE 1

| n | 2 | 3 | 4 | 5 |
|---|---|---|---|---|
| $r(S_{11})$ | 14.9% | 4.7% | 1.6% | 0.5% |

When n=4, it has been found that the dough has a good consistency while when n=3, it is dry and when n=5 it is too wet. If applied in a kitchen appliance 100, a threshold for $r(S_{11})$, e.g. 2-3% can be set so that when $r(S_{11})$ reaches value below the threshold, the dough moisture has been optimized and is ready for further treatment, e.g. for a food preparation process such as cooking or baking.

Normalized variance $(\delta S_{11}(m))/(\delta S_{11}^{max})$ values are listed in Table 2, where $\delta S_{11}(m)$ is the variance for m, and $\delta S11^{max}$ is the maximum value of $\delta S11$ so far as explained in more detail with the aid of Equation (2).

TABLE 2

| m | 1 | 2 | 3 | 4 | 5 |
|---|---|---|---|---|---|
| $\delta S_{11}(m)$ | 0.0653 | 0.1336 | 0.0462 | 0.0096 | 0.0027 |
| $\delta S_{11}^{max}$ | 0.0653 | 0.1336 | 0.1336 | 0.1336 | 0.1336 |
| $(\delta S_{11}(m))/(\delta S_{11}^{max})$ | 100% | 100% | 34.58% | 7.19% | 2.02% |

It is demonstrated that it is equally feasible to set a threshold value for $(\delta S_{11}(m))/(\delta S_{11}^{max})$, e.g. 10% such that when $(\delta S_{11}(m))/(\delta S_{11}^{max})$ falls below this predefined threshold, the dough moisture content has been optimized and the dough is ready for further processing, e.g. cooking or baking. Note that in the initial stages, the variance $\delta S_{11}$ (1) is actually smaller than $\delta S_{11}$ (2). This is because only a small amount of water was added to relatively dry dough resulting in a relatively small initial variance.

Example 3—Controlling Gelatinization in Starch-Rich Foods

Flour samples were obtained from a local supplier, and mixed with water at a ratio of 2:1 by weight to form wet dough. The dielectric sensor as described in detail in Example 1 was used for dielectric measurements. The RF probe and a thermal probe were inserted into the dough to monitor the dielectric properties and temperature. The dough was wrapped with plastic to keep the flour-water ratio reasonably constant.

Figure 13:
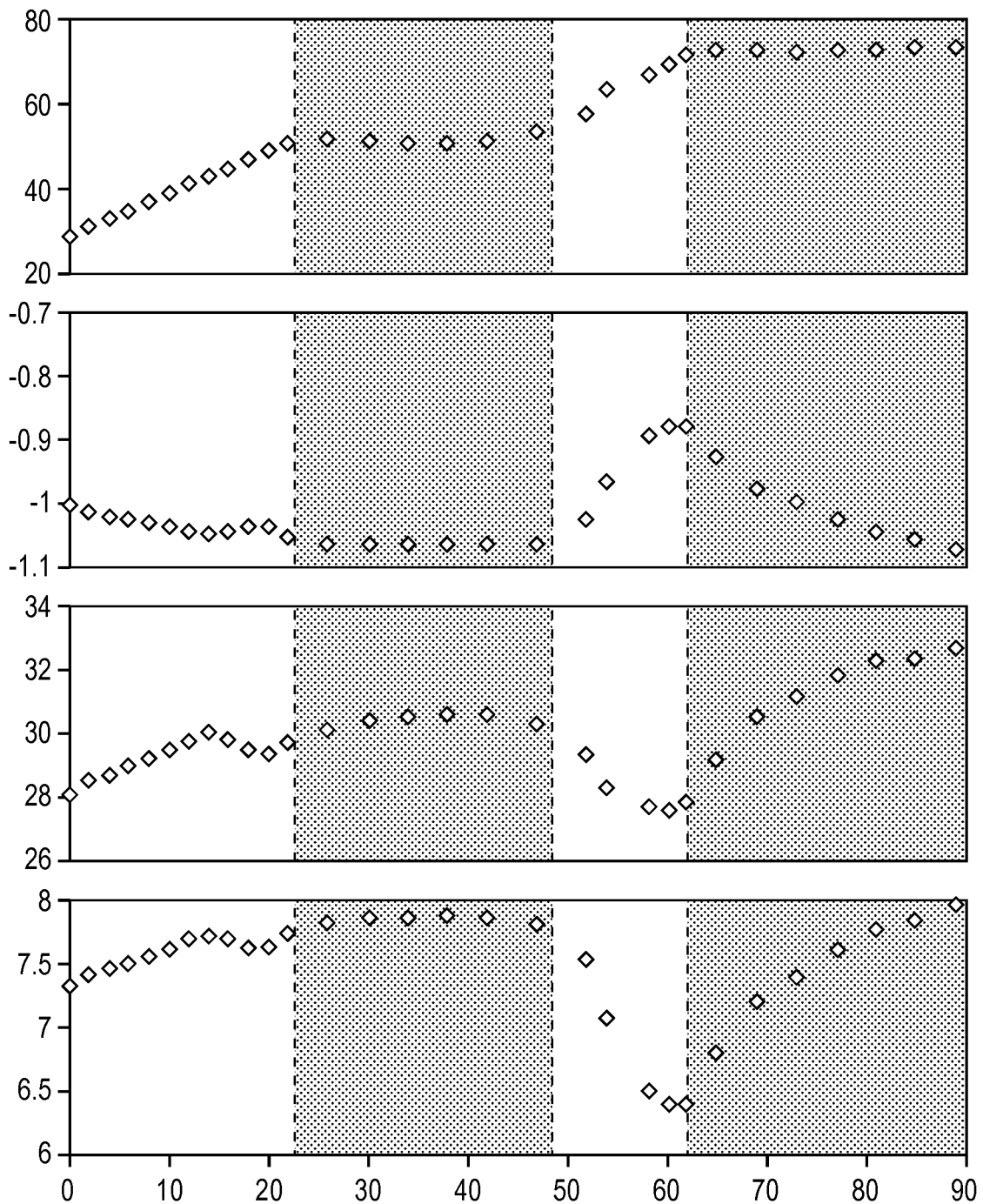
FIG. 13 is a graph of key parameters of a starch-water mixture as a function of time.

Both the amplitude and the phase of $S_{11}$ were recorded indicating the dielectric property change due to temperature or gelatinization. Since the dielectric properties of the dough are a function of temperature, a water bath was employed to control the heating curve of the dough. The temperature was brought to 55° C. (below the gelatinization temperature) and kept constant for 25 min, and after the temperature was increased to 75° C. (above the gelatinization temperature) and kept constant for another 25 min. FIG. 13 shows the temperature (top panel), $S_{11}$ (second panel from the top) permittivity (second panel from the bottom) and loss factor (bottom panel) at a probe frequency of 915 MHz as a function of time. The shaded areas indicate the periods of time during which the temperature was kept constant.

FIG. 13 clearly demonstrates that where the temperature was kept at about 50° C., $S_{11}$, permittivity and loss factor remained largely constant, whereas once the temperature was elevated and kept at ~75° C., $S_{11}$, permittivity and loss factor all changed over time even when the dough was kept at a constant temperature (above the gelatinization temperature of the dough). This therefore demonstrates that starch gelatinization causes dielectric changes in the dough that inter alia may be monitored using the ratio $S_{11}$.

Figure 14:
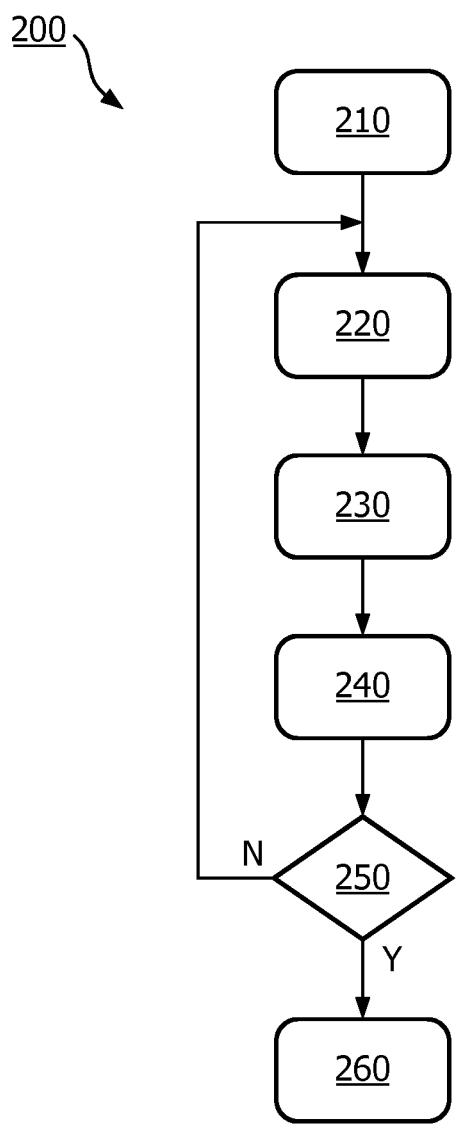
FIG. 14 is a flow chart of a method according to an embodiment.

FIG. 14 depicts a flow chart of a method 200 according to an embodiment. The method 200 may be for controlling a flour product-based food preparation process, as explained in more detail above. The method 200 may start in step 210 with switching on the kitchen appliance 100 and filling the compartment 110 with flour or a flour-based product such as dough. The method 200 subsequently proceeds to step 220, in which a dielectric property of the flour or a flour-based product during a food product preparation process, e.g. a kneading process, cooking process or baking process or the like, is measured. In an embodiment, the dielectric property is the ratio $S_{11}$ as previously explained. A dielectric sensor 120 as explained above may be used for this measurement.

The thus obtained dielectric property is used in step 230 to determine an initial moisture content of the flour or flour product from the measured dielectric property, for instance using any of the aforementioned equations. This step may be executed by the processing stage 130. The thus determined initial moisture content is used to generate a control signal for adding water to the flour or flour product as a function of said determined moisture content, for instance by calculating a difference between the determined moisture content and a target moisture content and generating the control signal based on this calculated difference, or by monitoring trends in the determined moisture content (e.g. indirectly via trends in the monitored dielectric property) and generating the control signal as long as these trends do not exhibit a predefined characteristic indicative of the flour or flour product having reached the desired moisture content as explained in more detail above. The control signal may be used to control a display 105 for displaying water addition instructions for manual water addition or may control a water inlet 140 for automatic water addition as previously explained. It is checked in step 250 if sufficient water has been added to the flour or flour product; if this is not yet the case the method 200 reverts back to step 220, otherwise the method 200 terminates in step 260.

In an embodiment, the method 200 may further comprise the optional steps of determining the amount of water bound to the flour product, e.g. in step 230; and generating a further control signal for controlling an amount of power supplied to a heating unit as a function of the determined amount of bound water, e.g. in step 240, where may be checked in a further step such as step 250 if the cooking or baking of the starch-containing flour product is complete based on its degree of gelatinization, as can be derived from the amount of water bound to the flour product as explained in more detail above. Other variations and additions to the method 200 based on the foregoing detailed description of the various embodiments of the kitchen appliance 100 and the examples demonstrating the proof of concept will be immediately apparent to the skilled person.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A kitchen appliance comprising:
a compartment that comprises a floor for receiving a single quantity of flour or a single quantity of product that includes flour, wherein said compartment is provided with a sensor for producing a sensor reading indicative of a dielectric property of said single quantity of flour or said single quantity of product that includes flour, and wherein said compartment is further provided with an interchangeable mixing implement for performing a food processing function with said single quantity of flour or said single quantity of product that includes flour; and
a processing arrangement communicatively coupled to the sensor (i) for determining an initial moisture content of said single quantity of flour or said single quantity of product that includes flour from said sensor reading, and (ii) for determining further moisture content in response to a series of periodic additional sensor readings, wherein said processing arrangement generates a control signal indicative of an amount of water to be added to said single quantity of flour or said single quantity of product that includes flour as a function of a trend in the dielectric property below a threshold value indicative of an optimal value of moisture based upon the determined initial moisture content and the determined further moisture content in response to the series of periodic additional sensor readings,
wherein the sensor comprises a probe for transmitting a radio-frequency signal and for receiving a reflection of said radio-frequency signal, and wherein said dielectric property is determined as a ratio of reflected radio-frequency power to transmitted radio-frequency power.

2. The kitchen appliance of claim 1, wherein the kitchen appliance comprises a user interface including a display screen, wherein the control signal is for generating a water addition instruction on said display screen.

3. The kitchen appliance of claim 1, further comprising a water inlet responsive to said control signal.

4. The kitchen appliance of claim 1, wherein the sensor is located in one selected from the group consisting of (i) the floor of the compartment, (ii) above said single quantity of flour or said single quantity of product that includes flour in the compartment, and (iii) the interchangeable mixing implement.

5. The kitchen appliance of claim 1, wherein the probe is a coaxial probe that comprises a coaxial line for transmitting the radio-frequency signal and a flange adjacent said coaxial line for receiving said reflection.

6. The kitchen appliance of claim 1, wherein the processing arrangement is arranged to further generate the control signal based on a user preference of a property of a food product to be produced from said single quantity of flour or said single quantity of product that includes flour.

7. The kitchen appliance of claim 1, wherein the processing arrangement is programmable to receive a correlation between the sensor reading and initial moisture content.

8. The kitchen appliance of claim 1, wherein the processing arrangement comprises a detection stage for detecting the sensor reading, a determination stage for determining the initial moisture content from the detected sensor reading and a water adding stage for generating the control signal.

9. The kitchen appliance of claim 1, wherein the processing arrangement is further for operating the kitchen appliance as a function of the trend in the dielectric property below the threshold value indicative of an optimal value of moisture based upon the determined initial moisture content and the determined further moisture content in response to the series of periodic additional sensor readings.

10. The kitchen appliance of claim 9, further comprising a heating unit, wherein the processing arrangement is further adapted to determine an amount of water bound to said single quantity of flour or said single quantity of product that includes flour from the trend in the dielectric property below the threshold value indicative of an optimal value of moisture based upon the determined initial moisture content and the determined further moisture content in response to the series of periodic additional sensor readings and to generate a further control signal for controlling an amount of power supplied to the heating unit as a function of the determined amount of bound water.

11. The kitchen appliance of claim 1, wherein the kitchen appliance is one of a noodle maker, dough maker or bread maker.

12. A method of controlling a flour product-based food preparation process, the method comprising:
   measuring, via a sensor for producing a sensor reading indicative of a dielectric property of flour or a product that includes flour received in a compartment that comprises a floor for receiving a single quantity of the flour or a single quantity of product that includes flour, the dielectric property of the single quantity of flour or the single quantity of product that includes flour during the food preparation process, and wherein the compartment is further provided with an interchangeable mixing implement for performing a food processing function with the single quantity of flour or the single quantity of product that includes flour;
   determining, via a processing arrangement, an initial moisture content of the single quantity of flour or the single quantity of product that includes flour from the measured dielectric property from the sensor reading and determining, via the processing arrangement, further moisture content in response to a series of periodic additional sensor readings; and
   generating, via the processing arrangement, a control signal for adding water to the single quantity of flour or the single quantity of product that includes flour as a function of a trend in the dielectric property below a threshold value indicative of an optimal value of moisture based upon said determined initial moisture content and the determined further moisture content in response to the series of periodic additional sensor readings,
   wherein measuring, via the sensor, comprises transmitting, via a probe, a radio-frequency signal and receiving, via the probe, a reflection of said radio-frequency signal, and wherein said dielectric property is determined as a ratio of reflected radio-frequency power to transmitted radio-frequency power.

13. The method of claim 12, further comprising:
   determining an amount of water bound to the single quantity of flour or the single quantity of product that includes flour; and
   generating, via the processing arrangement, a further control signal for controlling an amount of power supplied to a heating unit as a function of the determined amount of bound water.

14. The method of claim 12, wherein the sensor is located in one selected from the group consisting of (i) the floor of the compartment, (ii) above said single quantity of flour or said single quantity of product that includes flour in the compartment, and (iii) the interchangeable mixing implement.

15. The method of claim 14, wherein transmitting a radio-frequency signal and receiving a reflection of said radio-frequency signal, via the probe, comprises transmitting and receiving via a coaxial probe that includes a coaxial line for transmitting the radio-frequency signal and a flange adjacent said coaxial line for receiving said reflection.

16. The method of claim 12, wherein generating the control signal, via the processing arrangement, further comprises generating the control signal based on a user preference of a property of a food product to be produced from said single quantity of flour or said single quantity of product that includes flour.

17. A kitchen appliance comprising:
   a compartment that comprises a floor for receiving a single quantity of flour or a single quantity of product that includes flour, wherein said compartment is provided with a sensor for producing a sensor reading indicative of a dielectric property of said single quantity of flour or said single quantity of product that includes flour, and wherein said compartment is further provided with an interchangeable mixing implement for performing a food processing function with said single quantity of flour or said single quantity of product that includes flour; and
   a processing arrangement communicatively coupled to the sensor (i) for determining an initial moisture content of said single quantity of flour or said single quantity of product that includes flour from said sensor reading, and (ii) for determining further moisture content in response to a series of periodic additional sensor readings, wherein said processing arrangement generates a control signal indicative of an amount of water to be added to said single quantity of flour or said single quantity of product that includes flour as a function of a trend in the dielectric property below a threshold value indicative of an optimal value of moisture based upon the determined initial moisture content and the determined further moisture content in response to the series of periodic additional sensor readings,
   wherein the sensor comprises a probe for transmitting a radio-frequency signal and for receiving a reflection of said radio-frequency signal, and wherein said dielectric property is determined as a ratio of reflected radio-frequency power to transmitted radio-frequency power,
   wherein the sensor is located in one selected from the group consisting of (i) the floor of the compartment, (ii) above said single quantity of flour or said single quantity of product that includes flour in the compartment, and (iii) the interchangeable mixing implement, and
   wherein the processing arrangement comprises a detection stage for detecting the sensor reading, a determination stage for determining the initial moisture content from the detected sensor reading and a water adding stage for generating the control signal.

18. The kitchen appliance of claim 17, wherein the processing arrangement is arranged to further generate the control signal based on a user preference of a property of a food product to be produced from said single quantity of flour or said single quantity of product that includes flour.

19. The kitchen appliance of claim 17, wherein the processing arrangement is further for operating the kitchen appliance as a function of the trend in the dielectric property below the threshold value indicative of an optimal value of moisture based upon the determined initial moisture content and the determined further moisture content in response to the series of periodic additional sensor readings.

20. The kitchen appliance of claim 17, further comprising a heating unit, wherein the processing arrangement is further adapted to determine an amount of water bound to said single quantity of flour or said single quantity of product that includes flour from the trend in the dielectric property below the threshold value indicative of an optimal value of moisture based upon the determined initial moisture content and the determined further moisture content in response to the series of periodic additional sensor readings and to generate a further control signal for controlling an amount of power supplied to the heating unit as a function of the determined amount of bound water.

\* \* \* \* \*